United States Patent
Worley et al.

(10) Patent No.: US 7,785,400 B1
(45) Date of Patent: Aug. 31, 2010

(54) SPHERICAL SAND SEPARATORS

(75) Inventors: Emmett Ronald Worley, Odessa, TX (US); Shirley Royce Green, Wimberly, TX (US)

(73) Assignee: Sand Separators LLC, San Antonio, TX (US)

( * ) Notice: Subject to any disclaimer, the term of this patent is extended or adjusted under 35 U.S.C. 154(b) by 0 days.

(21) Appl. No.: 12/459,334

(22) Filed: Jun. 30, 2009

(51) Int. Cl.
*B01D 19/00* (2006.01)

(52) U.S. Cl. .............................. 95/262; 95/260; 96/155; 96/182; 96/183; 96/184; 96/220; 55/423; 55/426; 55/424

(58) Field of Classification Search .................... 55/423, 55/426, 424; 95/262, 260; 96/155, 182, 96/183, 184, 204, 206, 220; 166/267; 220/4.12
See application file for complete search history.

(56) References Cited

U.S. PATENT DOCUMENTS

| | | | |
|---|---|---|---|
| 2,754,970 A | 7/1956 | Ross ........................... 210/61 |
| 3,492,795 A * | 2/1970 | Guerrieri ..................... 55/463 |
| 3,568,847 A | 3/1971 | Carr ........................... 210/512 |
| RE27,308 E * | 3/1972 | Leonard ...................... 166/357 |
| 3,822,533 A * | 7/1974 | Oranje ........................ 55/394 |
| 3,873,283 A * | 3/1975 | Hamblin ...................... 96/189 |
| 4,157,903 A | 6/1979 | Kanda et al. ................. 55/393 |
| 4,187,088 A * | 2/1980 | Hodgson ..................... 96/171 |
| 4,221,577 A * | 9/1980 | Lowrie ........................ 55/392 |
| 4,519,848 A | 5/1985 | Underwood ................. 134/34 |
| 4,626,360 A | 12/1986 | Senyard, Sr. et al. ........ 210/799 |
| 4,737,271 A | 4/1988 | Childs ......................... 209/144 |
| 4,737,282 A | 4/1988 | Senyard, Sr. et al. ........ 210/188 |
| 4,948,393 A | 8/1990 | Hodson et al. ................. 55/40 |
| 5,296,104 A * | 3/1994 | Signorini et al. ............. 203/83 |
| 5,819,955 A | 10/1998 | Clarke ......................... 209/732 |
| 5,958,108 A * | 9/1999 | Minihan ........................ 95/24 |
| 6,019,825 A | 2/2000 | Greene et al. ................. 96/209 |
| 6,171,465 B1 * | 1/2001 | Compton ..................... 204/570 |
| 7,044,999 B2 * | 5/2006 | Bankstahl et al. ............. 96/189 |
| 7,147,788 B2 | 12/2006 | Tveiten ........................ 210/788 |
| 7,150,773 B1 * | 12/2006 | Duke ............................ 55/418 |
| 7,537,627 B2 * | 5/2009 | Scherrer ....................... 55/440 |
| 2004/0004028 A1 * | 1/2004 | Stell et al. ..................... 208/130 |
| 2007/0215524 A1 * | 9/2007 | Stell et al. ..................... 208/184 |

\* cited by examiner

*Primary Examiner*—Jason M Greene
*Assistant Examiner*—Dung Bui
(74) *Attorney, Agent, or Firm*—Keith B. Willhelm

(57) ABSTRACT

An apparatus for separating natural gas from production streams comprising a liquid dispersion of water, sand, and natural gas is provided for. The separator comprises a vessel having an interior surface defining a spherical interior space. The interior space allows a production stream introduced therein to experience a velocity drop sufficient to allow separation of the natural gas from the sand and water components. The separator also comprises a stream inlet port in the vessel, a liquid drain in the lower end of the vessel, and a gas outlet port at the upper end of the vessel remote from the stream inlet port. A baffle is mounted in the interior of the vessel in the path of the production stream between the stream inlet port and the gas outlet port. The baffle is effective to spread and direct a high pressure production stream introduced into the interior space via the stream inlet port downward toward the liquid drain.

35 Claims, 3 Drawing Sheets

SPHERICAL SAND SEPARATORS

FIELD OF THE INVENTION

The present invention relates to separators used in natural gas well completion and production operations and, and more particularly, to spherical sand separators particularly suited for use in separating natural gas from high pressure, high velocity production streams containing relatively large quantities of water and sand.

BACKGROUND OF THE INVENTION

Hydrocarbons, such as oil and gas, may be recovered from various types of subsurface geological formations. Such formations typically consist of a porous layer, such as limestone and sands, overlaid by a nonporous layer. Hydrocarbons cannot rise through the nonporous layer, and thus, the porous layer forms a reservoir in which hydrocarbons are able to collect. A well is drilled through the earth until the hydrocarbon bearing formation is reached. Hydrocarbons then are able to flow from the porous formation into the well.

In practice, however, production from a natural gas well is rarely that simple. Many formations are minimally porous and do not readily allow gas to flow from the formation to a well bore. Thus, various strategies have been devised for enhancing the flow from such formations, including "horizontal" drilling and "fracking" the formation. That is, instead of drilling more or less vertically through a more or less horizontally oriented formation, techniques have been developed which allow a well bore to be drilled horizontally along a formation. This greatly increases the exposure of the well bore to a formation and, therefore, reduces the distance gas must travel through the formation in order to reach the well bore.

"Fracking" is another technique designed to increase the flow of gas from a formation. It involves drilling one or more "injection" wells in the vicinity of the "production" well through which natural gas eventually will be produced. Water and sand then are pumped through the injection wells into the minimally porous formation at very high pressures such that the injected fluid is encouraged to flow toward the "production" well. This process tends to "fracture" the formation, i.e., to open up pores and create flow paths from the formation to the production well.

While such techniques are very effective at ultimately increasing the flow of natural gas from a minimally porous formation, they create immediate challenges that must be met. In particular, the large quantities of water, sand, and other liquid and particulate additives that are injected into the formation during fracking eventually must be allowed to flow out of the formation. Also, since the well bore is passing horizontally through a fractured formation, the amount of particulate matter falling out from the formation itself is much greater than would be encountered with a vertical well or from an unfractured formation. The vast majority of the water and sand eventually will pass out of the well and the stream flowing from the production well will be relatively clean to natural gas. During the initial phase of production from such wells, however, the stream is typically a liquid dispersion containing not only natural gas, but also large quantities of water, sand, and any other additives that were injected into the well during fracking. That water and sand must be removed in order to process the natural gas and render it suitable for distribution and use.

It also will be appreciated that it is important to achieve effective removal of both water and sand from a production stream. Natural gas must pass through a variety of processing equipment and transmission pipelines before it is actually used. Entrained sand can be very corrosive to such systems, especially the various valves, chokes, and dryers typically incorporated into such systems. Liquid water also is corrosive, particularly as it may absorb various chemicals originating in the well that can render it acidic. Since the gas typically will experience pressure drops as it is processed and transported, water vapor will condense in the system unless it has been reduced.

Conventional apparatus, commonly referred to as sand separators, typically are cylindrically shaped, vertically oriented vessels. A production stream is introduced at the upper end of the vessel through an inlet port. The interior of the vessel is sized to allow the production stream to experience a sufficiently large velocity drop such that natural gas will separate. A vertical divider plate, which typically extends down the middle of the cylinder between the inlet port and the gas port for approximately ¾ of the length of the cylinder, forces fluid flow past a drain located at the bottom of the cylinder. The water and sand components of the stream are allowed to exit the bottom of the vessel through the drain while the gas rises back to the top of the vessel and eventually out of the vessel via a gas port.

While such conventional sand separators have been generally effective where the production stream has relatively lower pressures and flow rates and has relatively little sand and water, they are not well suited to high pressure, high velocity streams containing relatively large quantities of sand and water as are more and more commonly encountered. Such separators allow high pressure streams tend to blow out too much sand and water.

It also will be appreciated that sand separators typically are fabricated from cast steel and are on the order of 16 to 24 inches (O.D.) in diameter, 5 to 8 feet in length, and have wall thicknesses of from about 2 to 3 inches or more. Thus, the amount of material required for fabrication is substantial, as is the weight of such apparatus.

SUMMARY OF THE INVENTION

The subject invention provides for an apparatus and methods for separating natural gas from high pressure, high velocity production streams comprising a liquid dispersion of water, sand, and natural gas. The separator comprises a vessel having an interior surface defining a spherical interior space. The interior space allows a production stream introduced therein to experience a velocity drop sufficient to allow separation of the natural gas from the sand and water components. The separator also comprises a stream inlet port in the vessel, a liquid drain in the lower end of the vessel, and a gas outlet port at the upper end of the vessel remote from the stream inlet port. A baffle is mounted in the interior of the vessel in the path of the production stream between the stream inlet port and the gas outlet port. The baffle is effective to spread the flow of and to direct a production stream introduced into the interior space via the stream inlet port downward toward the liquid drain.

It will be appreciated that such vessels have provided excellent results in separating such high pressure, high velocity production streams. By providing a spherical vessel the novel apparatus may be safely operated at higher pressures relative to comparably fabricated separators having a cylindrical vessel of equivalent volume and comparable flow profiles. Put another way, because the novel apparatus have a spherical vessel they may be fabricated with thinner walls and less material than a cylindrical separator capable of accommodating equivalent pressures. Similarly, because the novel separators have a spherical vessel they may provide an equivalent volume and better flow patterns for gas separation, yet they are more compact, require less material for their fabrication, and are lighter and more easily handled than cylindrically shaped separators.

Alternate embodiments of the invention have inlet ports with replaceable, releaseably mounted nozzles. Other embodiments have replaceable, sacrificial deflectors, such as may be mounted on the tip of a releaseably mounted nozzle to manage the erosive effects of sand passing through the separators. Still other embodiments incorporate means for minimizing the formation of a vortex in the vicinity of the drain port, such as a vortex breaker. Such vortex breakers help minimize flow of gas through the drain port. Additional embodiments, and benefits and advantages of the novel separators will become apparent upon reference to the drawings and detailed description that follows.

DESCRIPTION OF ILLUSTRATIVE EMBODIMENTS

The apparatus of the subject invention, such as the preferred embodiment 10 illustrated in FIGS. 1-7, are designed to effectively separate natural gas from production streams, especially high pressure, high velocity production streams, comprising water and sand. In particular, they are adapted to handle high pressure, high velocity production streams such as a produced in the early stages of production from a horizontal well that has been fractured. Such streams typically will be produced, at least initially, at pressures in the range of from 3,000 to 5,000 psi, and more and more commonly up to 10,000 psi. The flow rates through a typical 3 or 4 inch production line can approach a million cubic feet per hour or more. It will be readily appreciated that the corresponding velocity of those production streams is extremely high.

During the initial stages of production the stream from such wells typically is in the form of a liquid dispersion with water being the major phase. The stream also may comprise other liquid and dissolved components that were either released naturally by the well or added to the injection fluid. As used herein, "water" shall be understood as including not only water per se, but also the liquid phase in general and its various components. Those high pressure production streams also comprise large concentrations of sand dispersed in the liquid phase. The sand may have been injected into the well during fracturing or it may have been released by the formation. Accordingly, "sand" shall be understood as encompassing not only sand, but also any other particulate matter present in the production stream.

In general, the novel apparatus comprise a vessel having an interior surface defining a spherical interior space. The spherical interior space allows a high pressure, high velocity natural gas production stream introduced into the interior space to experience a velocity drop sufficient to allow separation of natural gas from the sand and water components. The separator also comprises a stream inlet port, a liquid drain in the lower end of the vessel, and a gas outlet port in the upper end of the vessel remote from the inlet port. A baffle is mounted in the interior of the vessel between the stream inlet port and the gas outlet port. The baffle serves to expand and direct a stream introduced into the interior of the separator toward the liquid drain.

Figure 1:
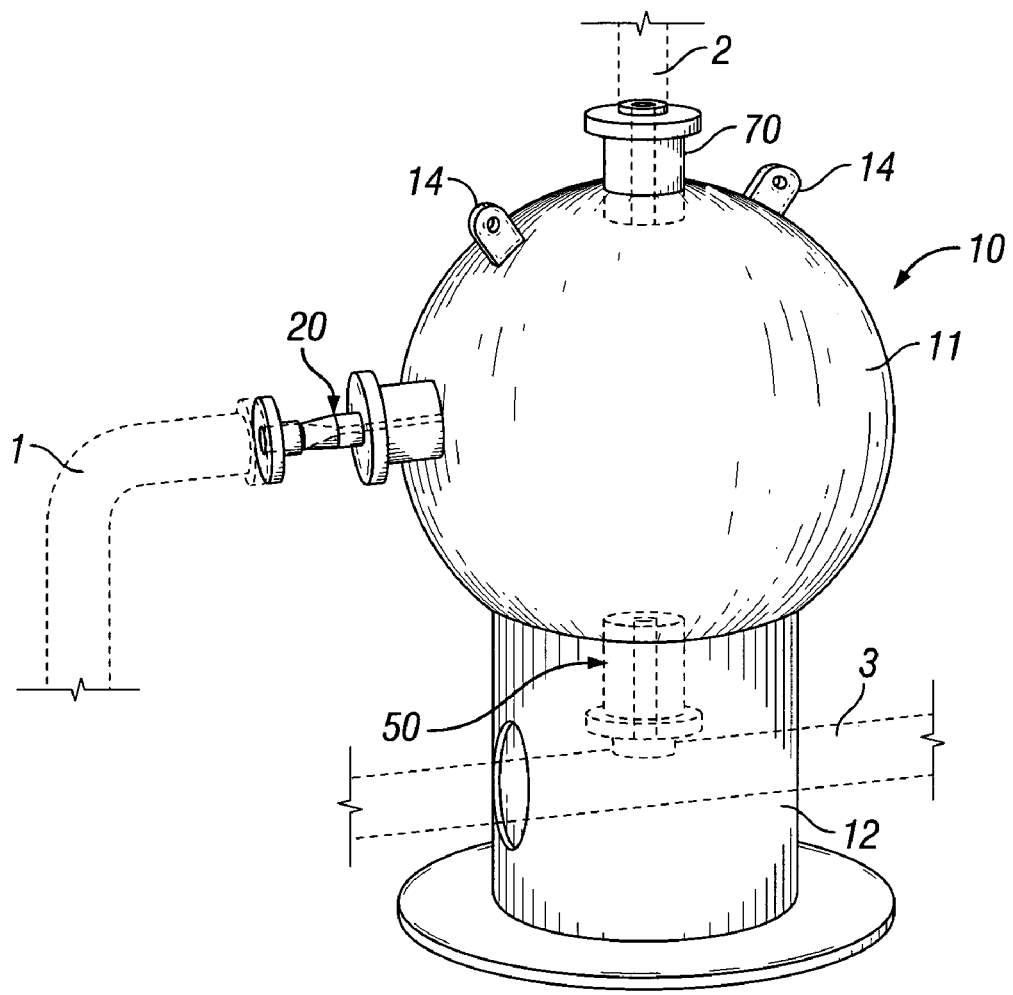
FIG. 1 is a perspective view of a preferred embodiment 10 of the sand separators of the subject invention showing the preferred separator 10 as it may be installed in a production pipeline.

A brief overview of the apparatus and methods of the subject invention may be provided by reference to FIG. 1, which is a perspective view of a preferred embodiment 10 of the novel separators installed in a production pipeline. As will be discussed in further detail below, a production stream passing through pipeline 1 is introduced into the separator 10 via a stream inlet port 20. The natural gas component of the production stream is then separated and allowed to flow out of separator 10 through a gas outlet port 70 and into a pipeline 2. The water and sand components of the production stream are allowed to drain out of separator 10 via a liquid drain 50 and a drain pipeline 3.

Vessel

More particularly, the apparatus of the subject invention comprise means for receiving and containing a production stream and allowing the production stream to experience a velocity drop sufficient to allow separation of natural gas from the sand and water components of said stream, such as a vessel. The vessel or other container means defines a spherical interior space having a vertical axis.

Figure 2:
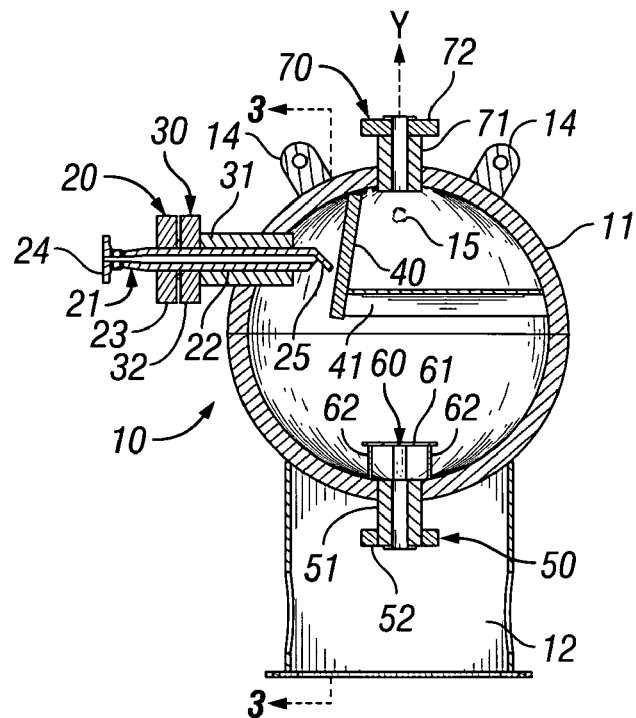
FIG. 2 is a cross-sectional view of the sand separator 10 shown in FIG. 1 taken along line 2-2 thereof.
Figure 3:
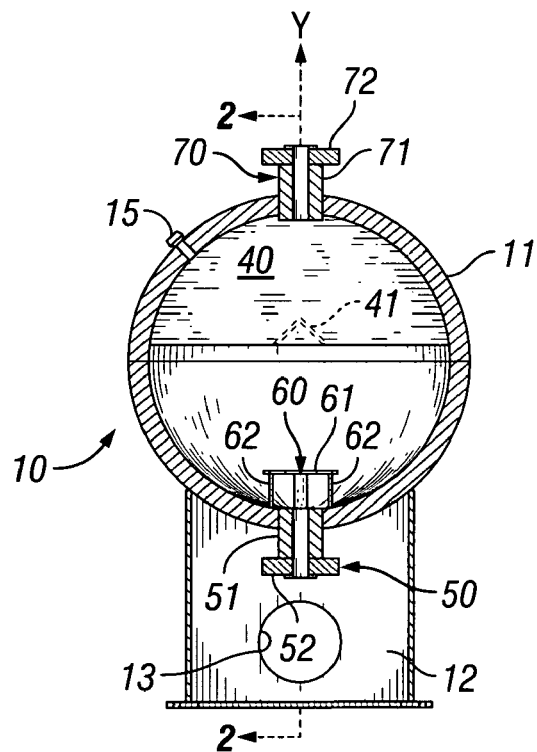
FIG. 3 is a cross-sectional view of the sand separator 10 shown in FIG. 1 taken along line 3-3 thereof.

For example, as shown in FIGS. 2 and 3, it may be seen that preferred embodiment 10 comprises a vessel 11 having an interior surface that defines a spherical interior space with a vertical axis Y. The interior space defined by vessel 11, relative to the cross-section of a stream introduced therein, is quite large. Thus, a production stream introduced into vessel 11 will experience a significant velocity drop. That is, the stream is introduced to a relatively long, broad flow path which allows the lighter natural gas to separate from the water and sand components of the stream. The gas thereafter will tend to rise and collect in the upper portion of vessel 11.

For example, most streams are produced from a well via 3 or 4 inch (ID) pipelines. The interior diameter of vessel 11 is 4 feet, and it defines a spherical volume of approximately 33.5 ft$^3$. Thus, a production stream introduced into vessel 11 will be introduced to a significantly larger volume which enables a significantly longer, broader and, most importantly, slower flow path which provides sufficient time to allow separation of natural gas. It will be appreciated, however, that the novel apparatus are not limited to such dimensions. The precise volume provided by the vessel may be varied significantly so long as the vessel provides a sufficient velocity drop for separation of natural gas. In general, it is desirable to maximize the vessel volume to the greatest extent possible, as in doing so the velocity drop is greatest and, other factors being equal, the stream is slowed to a greater extent and better separation of gas may be achieved. At some point, however, the additional cost of materials and handling issues resulting from increasing size and weight offset any benefits of enhanced separation. The minimum volume required to create a velocity drop sufficient to effectively separate gas will vary most significantly according to the size, pressure, and flow rates of the production stream.

It also will be appreciated that the vessel preferably defines, as best may achieved through typical manufacturing processes, a perfectly spherical interior. The subject invention, however, contemplates some deviation from a perfect sphere. So long as the interior is substantially spherically shaped the benefits of the novel apparatus may be realized.

By providing a spherical vessel the novel apparatus may be safely operated at higher pressures relative to comparably fabricated separators having a cylindrical vessel of equivalent volume. To the same point, but from a different perspective, because the novel apparatus have a spherical vessel they may be fabricated with thinner walls and less material than a cylindrical separator capable of accommodating equivalent pressures. Similarly, because the novel separators have a spherical vessel they may provide an equivalent volume and longer, slower flow paths, yet they are more compact, require less material for their fabrication, and are lighter that are cylindrically shaped separators.

For example, the vessel 11 of separator 10 is about 4.5 feet tall, has an inner diameter of 4 feet, an interior volume of approximately 33.5 ft$^3$, and is fabricated from steel cast at a thickness of approximately 3.25". It is designed to safely handle pressures up to approximately 5,000 psi. A cylindrical vessel having a diameter of 24 inches (O.D.) with the same wall thickness would have to be approximately 20 feet long to provide the same interior volume. Yet, especially in comparing the lower portion of the vessels, the cylindrical vessel would have significantly narrower flow paths and, therefore, would not decrease the stream flow nearly as much as vessel 11. Moreover, assuming the vessels are made of the same material, the cylindrical vessel would require approximately 4½ times more material and weigh approximately 4½ times more than spherical vessel 11. Finally, the cylindrical vessel, unlike spherical vessel 11, might not provide a separator that is rated for pressures up to 5,000 p.s.i.

As seen in FIGS. 1-3, the separator 10 also comprises a cylindrical skirt 12 which supports vessel 11 when the separator 10 is installed in a production pipeline. Support skirt 12 has openings 13 of suitable size to allow insertion of drain line 3 which, when installed, will be connected to liquid drain 50. Vessel 11 also is provided with lift lugs 14 which may be used to lift the separator 10, e.g., during shipment or installation. A threaded plug 15 is received in a suitable aperture in vessel 11. If desired, plug 15 may be replaced by temperature sensor, pressure sensor or other types of sensors as may be useful to monitor conditions in vessel 11.

Stream Inlet Port

The sand separators of the subject invention further comprise means for introducing a production stream into the interior of the container means, such as an inlet port. The stream introduction means are provided on the container means remote from the vertical axis of the spherical interior space. For example, as shown in FIGS. 1 and 2, the illustrative sand separator 10 comprises a stream inlet port 20. The inlet port 20 passes through the wall of vessel 11 at a distance from the vertical axis Y and gas outlet port 70. Inlet port 20 provides fluid communication between production pipeline 1 leading from a well to the interior of vessel 11.

Preferably, for reasons that will be discussed in greater detail below, the inlet port comprises a nozzle which provides a conduit for introducing a production stream into the interior of the vessel and which is releaseably mounted to the separator. The nozzle preferably is releaseably received in a nozzle receptacle. For example, as may be seen from FIG. 2, inlet port 20 of separator 10 comprises a nozzle 21 which is received in a nozzle receptacle 30. More particularly, nozzle receptacle 30 comprises a cylindrical body 31 that defines a cylindrical hole through which nozzle 21 may be inserted. Nozzle receptacle body 31 extends through a suitably configured aperture in the wall of vessel 11 located, as will be discussed in further detail below, at a point remote from gas outlet port.

Figure 4:
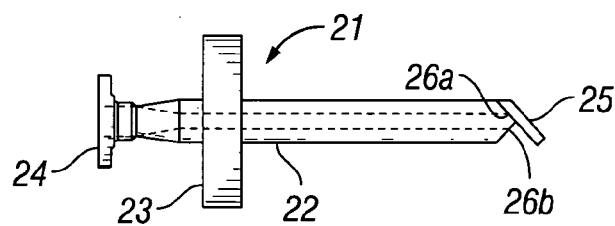
FIG. 4 is an enlarged, plan view of a replaceable nozzle 21 comprised by the sand separator 10.
Figure 5:
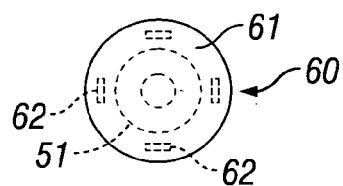
FIG. 5 is an enlarged, top plan view of a vortex breaker 60 comprised by the separator 10.

Nozzle 21, as may be seen best in FIG. 4, comprises a cylindrical body 22 defining a generally cylindrically shaped conduit through which a production stream may pass into the interior of vessel 11 of separator 10. Nozzle body 22 has an upstream end (left) and a downstream end or tip (right). It should be noted that the conduit in nozzle body 22 in its major portion is narrower than the inner diameter of production line 1 to which it is connected. Thus, the conduit tapers inwardly at its upstream end, creating a slight constriction. Nozzle 21 was used in separator 10 because it is a standard nozzle commonly employed in gas systems. It is not necessary, however, to provide such restrictions in nozzles used in the novel separators.

Nozzle 21 also is provided with a flange 23 which, together with a flange 32 provided on receptacle body 31, may be used to secure nozzle 21 to receptacle 30, e.g., via nuts and bolts (not shown) passing though matching apertures (not shown) in flanges 23 and 32. Similarly, nozzle 21 has a flange 24 at its upstream end which may be used to connect in a similar manner nozzle 21 to production pipeline 1 leading from a natural gas well.

It will be appreciated, however, that the specific manner of releaseably connecting a nozzle to a nozzle receptacle, or the structure of such releasable connections, is not a part of the subject invention. Similarly, the specific manner or apparatus used to connect the nozzle to a production pipeline is not part of the subject invention, nor are the connections between the liquid drain and a waste line or the gas outlet and a production pipeline. Preferably, such connections are designed to be releasable so that the separators may be easily installed into a production pipeline and removed when no longer needed. Thus, the nozzle, liquid drain, and gas outlet preferably include flanges, as shown, or other means for connecting those structures to the various conduits employed in the production system. Many suitable types of connections are known, and preferably the connection means incorporated in the novel apparatus are configured to be compatible with "hammer unions" and other standard connections commonly used in natural gas production and processing systems.

Moreover, while it preferably comprises a nozzle and a nozzle receptacle, the inlet port may be a simple one piece conduit, such as the liquid drain and gas outlet discussed below. Other high pressure port designs are known and may be used as well.

Baffle

The novel sand separators also comprise means provided in the interior of the container means for expanding the production stream and deflecting it downward and radially outward toward the vessel interior surface. For example, the sand separators may comprise a baffle having one or more interior deflector surfaces interposed in the path of a production stream introduced into a vessel so that the stream impinges against the to deflector surfaces, is spread thereby, and is encouraged to flow downward and radially outward toward the interior surface of the vessel and, ultimately, toward the liquid drain. Preferably, the deflector means comprise a replaceable sacrificial means for spreading and deflecting the fluid stream, such as a deflection surface mounted at the tip of a replaceable nozzle.

For example, as may be seen in FIGS. 2 and 4, nozzle 21 has a deflector 25 mounted on the interior end thereof and extending into the fluid path of a stream exiting nozzle 21. More specifically, the tip of nozzle 21 is truncated by a pair of radially opposed bevels 26 cut at angles of approximately 45° relative to the longitudinal axis of nozzle body 22. Nozzle deflector 25 is mounted on the upper bevel 26a. It will be appreciated that nozzle deflector 25 is an elliptically shaped plate. Deflector 25 is sized, and its upper edges are beveled such that its profile (relative to longitudinal axis of nozzle body 22) is coextensive with, and in any event, no greater than the profile of nozzle body 22. That ensures that nozzle body 22 may be inserted through nozzle receptacle 30.

It will be appreciated that deflector 25 mounted on upper bevel 26a of nozzle tip, together with the lower bevel 26b, defines a semi-elliptical aperture through which a stream flowing through nozzle 21 may flow into vessel 11. Since lower bevel 26b is also cut at a 45° angle, the cross section of the semi-elliptical aperture is approximately equal to the cross section of the conduit provided by nozzle body 22, thus ensuring that there is no constriction of a stream exiting nozzle 21.

Nozzle deflector 25 serves to deflect and disperse the production stream as it exits the tip of nozzle 21. The dispersion of the stream in turn accelerates and enhances the separation of gas from a stream flowing into the separator 10.

It will be appreciated that a typical stream from a newly produced well, especially a horizontal well that has been fractured, may carry large quantities of sand, and therefore can be very erosive, even of cast steel from which the separator components are made. The amount of wear over time can be significant, especially in the areas of the separator where a stream exiting the nozzle first impinges. If such failure areas are accessible only by disassembling the vessel, repair of the separator becomes time consuming and costly. By providing a deflector on a removable nozzle, however, such problems may be greatly minimized. The nozzle deflector absorbs most of the energy of the exiting stream and becomes the primary wear point. When it wears out, the nozzle may be removed and replaced with a new nozzle. Repair of the nozzle itself also is relatively easy as the tip may be ground down and a new deflector welded in place of the worn out deflector.

Thus, nozzle deflector 25, because it is mounted on replaceable nozzle 21, provides a sacrificial, replaceable means within vessel 11 for deflecting a production stream exiting inlet port 20. Deflector 25 is "sacrificial" in the sense that it is expected to wear out and fail, possibly repeatedly, over the normal service life of the separator. It also will be understood, of course, that "replaceable" in this context means that it may be replaced without disassembling or compromising the vessel itself, e.g., without cutting the vessel open to access the interior. Although such a configuration is preferred, it is not necessary that the sacrificial deflector be mounted on a replaceable nozzle. It may also be mounted on a cap in a manner such that when the cap is received in a complimentarily configured vessel aperture, the deflector extends into the path of a stream exiting the inlet port. Other such means may be devised.

Figure 6:
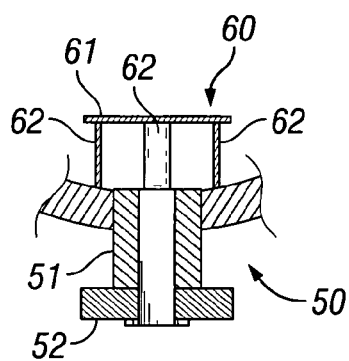
FIG. 6 is a cross-sectional view of the vortex breaker 60 shown in FIG. 5.
Figure 7:
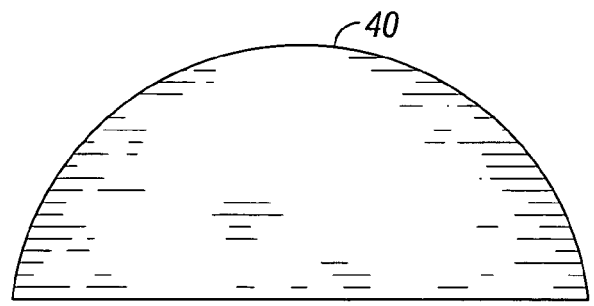
FIG. 7 is a top plan view of an inlet deflector 40 comprised by the separator 10.

As may be seen from FIG. 2, nozzle deflector 25 will deflect and disperse a stream exiting nozzle 21 downward toward an inlet deflector 40. Inlet deflector 40, as will be appreciated from comparing FIGS. 2, 3, and 6, is a semicircular plate mounted in the interior of vessel 11. For example, inlet deflector 40 is attached to the interior walls of vessel 11 about its upper edges, e.g., by spot welding, and is reinforced by a V-shaped brace 41 extending between the lower end of inlet deflector 40 and the opposing interior wall of vessel 11.

Inlet deflector 40 is situated generally in the upper half of vessel 11 and forms a wall generally intersecting the substantial portion of the upper half of the interior space. It extends continuously from the interior surfaces of vessel 11 to its lower end which extends to a level just above the equator of vessel 11. Its lower end is well below the level at which a production stream is introduced into vessel 11 and the level at which gas may flow out of vessel 11. Thus, any flow from stream inlet port 20 to gas outlet port 70 must flow downwards and under inlet deflector 40.

It also will be noted from FIG. 2 that inlet deflector 40 is mounted in the path of the deflected flow of a stream exiting nozzle 21 at an angle such that the stream is encouraged to flow downward and radially outward toward the interior surface of vessel 11. Deflector 40 also helps to further spread the flow through the vessel 11. Ultimately, deflector 40 will encourage the flow of the production stream toward the liquid drain.

Thus, nozzle deflector 25 and inlet deflector 40 cooperate to spread and to encourage the flow of a stream introduced into vessel 11 to turn downward and radially outward toward the walls of vessel 11. As the stream flows along the vessel walls, centrifugal forces are created that tend to separate or laminate the flow of the stream. This lamination not only encourages the much heavier sand particles to flow preferentially along the vessel walls, where they may be more effectively carried out the liquid drain, but it also encourages more rapid separation of the lighter natural gas from the stream.

Liquid Drain

The novel sand separators also comprise means provided on the bottom of the vessel proximate to, and preferably on the vertical axis for allowing the sand and water components to drain from the vessel, such as a liquid drain port. For example, as shown in FIGS. 2 and 3, sand separator 10 comprises a liquid drain port 50 situated in the lower end of vessel 11 on its vertical axis Y. Drain port 50 comprises a cylindrical body 51 that defines a conduit through which liquid and sand components of the production stream may drain from separator 10. Cylindrical body 51 extends through a suitably configured aperture in the walls of vessel 11 and is mounted thereto, e.g., by spot welding. It has a flange 52 at its downstream end which may be used to connect the drain to a waste line carrying the water and sand to an appropriate disposal location. As with the connections between nozzle 21 and production pipeline 1 and nozzle receptacle 30, the precise manner or apparatus used to connect liquid drain 50 to a waste line is not part of the subject invention.

As discussed above, baffles provided in vessel 11 encourage the stream to flow along the vessel walls where centrifugal forces tend to separate or laminate the flow of a stream. While that flow enhances separation, the spherical shape of vessel 11 also means that flow of liquid through the bottom of vessel 11 may form a vortex. The presence of swirling liquid in the vicinity of the drain will not be problematic, and in fact will tend to encourage flow of sand out of the drain. A vortex should not be allowed to develop to the point where it draws gas into the drain. Any such gas will be lost to the distribution system.

Thus, the separator also preferably comprises means for minimizing the formation of a vortex through the drain means, such as a vortex breaker. Sand separator 10, for example, comprises a vortex breaker 60 proximate to liquid drain 50. Vortex breaker 60 comprises a disc-shaped cover 61 that extends over and above liquid drain 50, being supported in such position by a plurality of legs 62 extending between cover 61 and the bottom of vessel 11. Cover 61 will tend to prevent the formation of a vortex that extends down into drain 50.

Gas Outlet Port

The sand separators of the subject invention also comprise means provided on the top of the container means proximate to, and preferably on the vertical axis for allowing the natural gas component to exit the container means, such as a gas outlet port at the upper end of a vessel. For example, as shown in FIGS. 2 and 3, separator 10 comprises a gas outlet port 70 situated in the upper end of the vessel 11 on its vertical axis Y. Gas outlet port 70 comprises a cylindrical body 71 that defines a conduit through which natural gas separated from the production stream may flow from separator 10. Cylindrical body 71 extends through a suitably configured aperture in the walls of vessel 11 and is mounted thereto, e.g., by spot welding. It has a flange 72 at its downstream end which may be used to connect gas outlet port 70 to production pipeline 2 transporting the natural gas to suitable processing and distribution facilities. As with the other connections discussed above, the precise manner or apparatus used to connect the gas outlet port to a production pipeline is not part of the subject invention.

Since gas naturally tends to rise and water to sink, gas outlet port 70 and liquid drain 50 preferably are located, respectively, at the top and bottom of vessel 11 on or about its vertical axis Y. In theory, ports 70 and 50 could be some distance from the axis Y and still provide acceptably efficient flow, but there generally is nothing to be gained from doing so. Inlet port 20 also preferably is disposed in the upper half of vessel 11 and generally perpendicular to vessel axis Y as this provides a longer flow path for the dispersed stream before it begins to pool at the bottom of the vessel 11 and also allows the establishment of some downward flow along the vessel walls and the creation of centrifugal forces as described above before the flow reaches the drain 50. The inlet port 20 and outlet port 70 also must be located remote from each other, i.e., at a sufficient distance to allow placement of the baffle in an effective manner.

As referenced in passing above, the various components of the novel separators generally are fabricated from cast or extruded steel and machined as appropriate. For example, the vessel may be fabricated from cast steel hemispheres having suitable machined apertures which are then welded together. Except as noted in respect to removable components, the other components also may be welded to the vessel. A variety of steels and other materials suitable for use in high pressure natural gas pipelines and processing equipment are known and may be used as desired.

Thus, it will be appreciated that the novel separators provide an effective method for removing natural gas from production streams, especially high pressure, high velocity production streams containing large quantities of water and sand. A production stream is introduced via an inlet port into a vessel which has a spherical interior space, such as vessel 11 of separator 10. The production stream then is spread and directed downward and radially outward toward the exterior of the spherical space, e.g., by nozzle deflector 25 and inlet deflector 40. This not only allows the natural gas to separate from the stream, but also encourages the formation of a laminar flow so that water in the stream can sweep sand along with it as it is discharged through a drain, such as drain 50. The natural gas then rises to the top of the vessel and is released into a production conduit via an outlet port, such as gas outlet 70.

The novel separators may, and typically will be used with other control equipment, such as chokes, valves, and the like, to control the flow into and out of the separator. For example, shut-off valves may be used to cut off flow to the separator so that it may be serviced. Also, a choke valve may be installed in the drain line to reduce the amount of flow out of the separator drain if the production stream increases in gas content. Likewise, water may be injected upstream of the separator through suitable supply lines and valves to enhance the separation of relatively dry, but sandy production streams. Other control equipment may be used as well.

While this invention has been disclosed and discussed primarily in terms of specific embodiments thereof, it is not intended to be limited thereto. Other modifications and embodiments will be apparent to the worker in the art.

What is claimed is:

1. An apparatus for separating natural gas from high pressure, high velocity production streams comprising a liquid dispersion of water, sand, and natural gas, said separator comprising:
    (a) a vessel having an interior surface defining a spherical interior space, said interior space allowing a production stream comprising a liquid dispersion of water, sand, and natural gas introduced therein to experience a velocity drop sufficient to allow separation of said natural gas from said sand and water components;
    (b) a stream inlet port in said vessel;
    (c) a liquid drain in the lower end of said vessel;
    (d) a gas outlet port at the upper end of said vessel remote from said stream inlet port; and
    (e) a baffle mounted in the interior of said vessel in the path of said production stream between said stream inlet port and said gas outlet port; said baffle effective to spread and direct said production stream introduced into said interior space via said stream inlet port downward toward said liquid drain and to encourage the flow of said sand and water components therethrough.

2. The apparatus of claim 1, wherein said stream inlet port comprises a nozzle providing a conduit for introducing said stream into the interior of said vessel and a nozzle receptacle extending through said vessel, said nozzle receptacle being adapted to releaseably receive said nozzle.

3. The apparatus of claim 1, wherein said baffle comprises a semicircular deflector mounted in the upper half of said interior space between said stream inlet port and said gas outlet port, said deflector intersecting said space from a point below said ports such that fluid flow from said stream inlet port to said gas outlet port must flow downwards and then under said deflector.

4. The apparatus of claim 3, wherein said separator comprises a vortex breaker proximate to said liquid drain.

5. The apparatus of claim 1, wherein said separator comprises a vortex breaker proximate to said liquid drain.

6. The apparatus of claim 5, wherein said vortex breaker comprises a cover extending over and above said liquid drain.

7. The apparatus of claim 5, wherein said vortex breaker comprises a disc shaped cover mounted above said sand drain by a plurality of legs extending between said cover and the bottom of said vessel.

8. The apparatus of claim 1, wherein said baffle comprises a first deflector mounted to said inlet port and extending into the path of said stream exiting said inlet port and a second deflector extending into the path of said deflected stream.

9. The apparatus of claim 8, wherein said second deflector comprises a semicircular deflector mounted in the upper half of said interior space between said stream inlet port and said gas outlet port, said deflector intersecting said space from a point below said ports such that fluid flow from said stream inlet port to said gas outlet port must flow downwards and then under said deflector.

10. The apparatus of claim 9, wherein said separator comprises a vortex breaker proximate to said liquid drain.

11. The apparatus of claim 8, wherein said separator comprises a vortex breaker proximate to said liquid drain.

12. The apparatus of claim 1, wherein said stream inlet port comprises a nozzle providing a conduit for introducing said stream into the interior of said vessel, wherein said nozzle is releaseably mounted to said separator.

13. The apparatus of claim 12, wherein said separator comprises a vortex breaker proximate to said liquid drain.

14. The apparatus of claim 12, wherein said baffle comprises a first deflector mounted to the interior end of said nozzle and extending into the fluid path of said stream exiting said nozzle and a second deflector mounted to the interior of said vessel and extending into the fluid path of said deflected stream.

15. The apparatus of claim 14, wherein said second deflector comprises a semicircular deflector mounted in the upper half of said interior space between said stream inlet port and said gas outlet port, said deflector intersecting said space from a point below said ports such that fluid flow from said stream inlet port to said gas outlet port must flow downwards and then under said deflector.

16. The apparatus of claim 15, wherein said separator comprises a vortex breaker proximate to said liquid drain.

17. The apparatus of claim 12, wherein said nozzle has a deflector mounted on the interior end thereof and extending into the fluid path of said stream exiting said nozzle.

18. The apparatus of claim 17, wherein said separator comprises a vortex breaker proximate to said liquid drain.

19. The apparatus of claim 17, wherein said nozzle comprises a cylindrical body having an interior end truncated by first and second bevels and said nozzle deflector is mounted on one of said beveled surfaces.

20. The apparatus of claim 19, wherein said nozzle deflector has a profile no greater than the profile of the nozzle body.

21. The apparatus of claim 19, where said other bevel provides an outlet for said nozzle having a cross section equal to or greater than the cross section of said nozzle cylindrical body.

22. The apparatus of claim 19, wherein said bevels extend at an angle approximately equal to 45° to the axis of said cylindrical body and are radially opposed to each other.

23. An apparatus for separating natural gas from high pressure, high velocity production streams comprising a liquid dispersion of water, sand, and natural gas, said separator comprising:

(a) a vessel having an interior surface that defines a spherical interior space having a vertical axis, said interior space allowing a production stream comprising a liquid dispersion of water, sand, and natural gas introduced therein to experience a velocity drop sufficient to allow separation of said natural gas from said sand and water components;

(b) a stream inlet port in said vessel situated remote from said vertical axis and in fluid communication with the interior of said vessel;

(c) a gas outlet port in said vessel situated proximate to the top of said vertical axis and in fluid communication with the interior of said vessel;

(d) a liquid drain in said vessel situated proximate to the bottom of said vertical axis and in fluid communication with the interior of said vessel; and (e) a baffle disposed in the interior of said vessel between said stream inlet port and said gas outlet port, said baffle comprising one or more deflection surfaces effective to spread and direct said production stream upon exiting said stream inlet port downward and radially outward toward to the interior surface of said vessel, thereby encouraging said liquid and sand components to flow downward toward said liquid drain.

24. An apparatus for separating natural gas from high pressure, high velocity production streams comprising a liquid dispersion of water, sand, and natural gas, said separator comprising:

(a) means for receiving and containing a production stream comprising a liquid dispersion of water, sand, and natural gas and allowing said production stream to experience a velocity drop sufficient to allow separation of natural gas from the sand and water components of said stream, wherein said container means defines a spherical interior space having a vertical axis;

(b) means for introducing said production stream into said interior space of said container means, wherein said introduction means are provided on said container means remote from said vertical axis;

(c) means for spreading and deflecting said production stream downward and radially outward toward said vessel interior surface, wherein said deflection means are provided in the interior of said container means;

(d) means for allowing said sand and water components to drain from said container means, wherein said drain means are provided on the bottom of said container means proximate to said vertical axis; and (e) means for allowing said natural gas component to flow out of said container means, wherein said outlet means are provided on the top of said container means proximate to said vertical axis.

25. The apparatus of claim 24, comprising means for minimizing the formation of a vortex through said drain means.

26. The apparatus of claim 24, comprising replaceable, sacrificial means for spreading and deflecting said production stream, said replaceable, sacrificial deflection means being disposed in the interior of said container means.

27. The apparatus of claim 26, comprising means for minimizing the formation of a vortex through said drain means.

28. A process for separating natural gas from high pressure, high velocity production streams comprising a liquid dispersion of water, sand, and natural gas, said process comprising:

(a) introducing a production stream through a stream inlet port into a vessel defining a spherical interior space, said interior space allowing said production stream to experience a velocity drop sufficient to allow release of said natural gas from said production stream;

(b) spreading and directing said production stream downward and radially outward toward the exterior of said spherical interior space;

(c) discharging said water and sand components through a liquid drain at the bottom of said vessel; and (d) releasing said natural gas components into a production conduit through a gas outlet port at the top of said vessel.

29. The process of claim 28, wherein said production stream is the initial production stream following a fracturing operation in a well.

30. The process of claim 28, wherein said vessel comprises a first deflector mounted to said inlet port and extending into the path of said stream exiting said inlet port and a second deflector extending into the path of said deflected stream.

31. The process of claim 30, wherein said second deflector comprises a semicircular deflector mounted in the upper half of said interior space between said stream inlet port and said gas outlet port, said deflector intersecting said space from a point below said ports such that fluid flow from said stream inlet port to said gas outlet port must flow downwards and then under said deflector.

32. The process of claim 28, wherein said stream inlet port comprises a nozzle providing a conduit for introducing said stream into the interior of said vessel, wherein said nozzle is releaseably mounted to said separator.

33. The process of claim 32, wherein said nozzle has a deflector mounted on the interior end thereof and extending into the fluid path of said stream exiting said nozzle.

34. The process of claim 32, wherein said nozzle has a deflector mounted on the interior end thereof and extending into the fluid path of said stream exiting said nozzle and a said vessel comprises a second deflector mounted to the interior of said vessel and extending into the fluid path of said deflected stream.

35. The process of claim 34, wherein said second deflector comprises a semicircular deflector mounted in the upper half of said interior space between said stream inlet port and said gas outlet port, said deflector intersecting said space from a point below said ports such that fluid flow from said stream inlet port to said gas outlet port must flow downwards and then under said deflector.

* * * * *